United States Patent
Zheng

(10) Patent No.: US 9,319,505 B2
(45) Date of Patent: Apr. 19, 2016

(54) TERMINAL EQUIPMENT WITH BUILT-IN RETRACTABLE HEADSET

(75) Inventor: Daqing Zheng, Urumqi (CN)

(73) Assignee: XINJIANG TIANDI GROUP, Urumqi (CN)

(*) Notice: Subject to any disclaimer, the term of this patent is extended or adjusted under 35 U.S.C. 154(b) by 237 days.

(21) Appl. No.: 14/125,268

(22) PCT Filed: Apr. 16, 2012

(86) PCT No.: PCT/CN2012/074086
§ 371 (c)(1),
(2), (4) Date: Mar. 7, 2014

(87) PCT Pub. No.: WO2012/167668
PCT Pub. Date: Dec. 13, 2012

(65) Prior Publication Data
US 2014/0187293 A1    Jul. 3, 2014

(30) Foreign Application Priority Data

Jun. 10, 2011 (CN) .......................... 2011 1 0156052
Jun. 10, 2011 (CN) ....................... 2011 2 0193874 U

(51) Int. Cl.
*H04M 1/00* (2006.01)
*H04M 1/60* (2006.01)
(Continued)

(52) U.S. Cl.
CPC .......... *H04M 1/6058* (2013.01); *H04M 1/0258* (2013.01); *H04M 1/1033* (2013.01); *H04R 1/1091* (2013.01); *H04R 5/033* (2013.01); *H04M 1/15* (2013.01)

(58) Field of Classification Search
CPC .............................. H04M 1/15; H04M 1/0258
USPC ............. 455/550.1, 575.1, 569.1, 557, 575.5, 455/556.1, 575.6, 90.3; 206/320
See application file for complete search history.

(56) References Cited

U.S. PATENT DOCUMENTS

| 8,165,646 B2 | 4/2012 | Zheng |
| 2003/0060241 A1* | 3/2003 | Loprete .................. H04M 1/05 455/569.1 |

(Continued)

FOREIGN PATENT DOCUMENTS

| CN | 2349734 Y | 11/1999 |
| CN | 2382185 Y | 6/2000 |

(Continued)

OTHER PUBLICATIONS

International Search Report and Written Opinion for PCT/CN2012/074086 (in Chinese and English), mailed Jul. 26, 2012.

(Continued)

*Primary Examiner* — John J Lee
(74) *Attorney, Agent, or Firm* — Harness, Dickey & Pierce, P.L.C.

(57) ABSTRACT

The present invention provides a terminal equipment with a built-in retractable headset, comprising a case body (1) of the terminal equipment which includes an accommodation space; a headset which is arranged in the accommodation space and includes a headset assembly (2) and a headset line (3) which both can be pulled out of the accommodation space; and a headset line retraction device (4) which is arranged in the accommodation space and with which the headset assembly (2) communicates via the headset line (3). A signal line led from the headset line retraction device (4) communicates with an audio signal of the terminal equipment, and the headset assembly (2) and the headset line (3) can be retracted from the outside of the accommodation space via the headset line retraction device (4). As a result, it is able to effectively reduce the harm of electromagnetic wave to human body and to facilitate the user to use.

8 Claims, 2 Drawing Sheets

(51) Int. Cl.
*H04M 1/02* (2006.01)
*H04R 1/10* (2006.01)
*H04R 5/033* (2006.01)
*H04M 1/15* (2006.01)

(56) References Cited

U.S. PATENT DOCUMENTS

| | | | |
|---|---|---|---|
| 2003/0068061 A1 | 4/2003 | Huang | |
| 2004/0159735 A1 | 8/2004 | Wei | |
| 2004/0204165 A1 | 10/2004 | Huang | |
| 2005/0008185 A1 | 1/2005 | Jeong et al. | |
| 2005/0072872 A1 | 4/2005 | Shack et al. | |
| 2005/0089186 A1 | 4/2005 | Kulas | |
| 2005/0090299 A1* | 4/2005 | Tsao | H01Q 1/245 455/575.5 |
| 2008/0080732 A1 | 4/2008 | Sneed | |
| 2008/0101633 A1 | 5/2008 | Ledbetter et al. | |
| 2010/0151922 A1* | 6/2010 | Zheng | H04R 1/1033 455/575.1 |
| 2012/0074006 A1* | 3/2012 | Monaco | H04M 1/15 206/320 |

FOREIGN PATENT DOCUMENTS

| | | |
|---|---|---|
| CN | 2488233 Y | 4/2002 |
| CN | 1645872 A | 7/2005 |
| CN | 2726235 Y | 9/2005 |
| CN | 2884719 Y | 3/2007 |
| CN | 101237713 A | 8/2008 |
| CN | 101378600 A | 3/2009 |
| CN | 201252589 Y | 6/2009 |
| CN | 101640827 A | 2/2010 |
| CN | 201422150 Y | 3/2010 |
| CN | 201430677 Y | 3/2010 |
| CN | 201699926 U | 1/2011 |
| CN | 102223587 A | 10/2011 |
| CN | 202068544 U | 12/2011 |
| CN | 202068546 U | 12/2011 |
| CN | 102469383 A | 5/2012 |
| CN | 102811400 A | 12/2012 |
| EP | 2451189 A2 | 5/2012 |

OTHER PUBLICATIONS

European Search Report for PCT/CN2012/074086, dated Oct. 14, 2014.
First Office Action regarding Chinese application No. 201110156052.4, dated Aug. 4, 2014. Translation provided by Dragon Intellectual Property Law Firm.
Second Office Action regarding Chinese application No. 201110156052.4, dated Jan. 7, 2015. Translation provided by Dragon Intellectual Property Law Firm.
Decision of Rejection regarding Chinese application No. 201110156052.4, dated May 4, 2015. Translation provided by Dragon Intellectual Property Law Firm.

* cited by examiner

TERMINAL EQUIPMENT WITH BUILT-IN RETRACTABLE HEADSET

CROSS REFERENCE TO RELATED APPLICATIONS

This application is a 371 U.S. National Stage of International Application No. PCT/CN2012/074086, filed on Apr. 16, 2012 and published in the Chinese language as WO 2012/167668 on Dec. 13, 2012. This application claims the benefit of Chinese Application Nos. 201110156052.4 and 201120193874.5, both filed on Jun. 10, 2011. The disclosures of the above applications are incorporated herein by reference.

TECHNICAL FIELD

The present invention relates to terminal equipment, in particular to terminal equipment with a built-in retractable headset.

BACKGROUND

With the extensive application of electronic products such as mobile phones, laptop computers, and the products with capability of aiding hearing, etc., it has been found that a headset of such a terminal product has problems of winding, knotting, and inconvenience of taking and keeping in use, which has caused some troubles to users and even further made some users give up using the headset.

In addition, when directly using the electronic products, the users cannot avoid electromagnetic radiation from the electronic products (such as a mobile phone) causing great harm to the users' health. For example, when the user directly puts the mobile phone on his ear to communicate with other person via a speaker, the electromagnetic radiation from the mobile phone causes harm to the central nervous system of the user's brain. It has been found, through experiments and studies, that the harm from electromagnetic radiation is reduced dramatically when the mobile phone keeps a certain distance away from the brain. For example, the speaker built in the mobile phone may be replaced with a mobile phone headset so as to receive the voice information. As a result, it is able to reduce the harm from electromagnetic wave to the brain by more than 90%.

SUMMARY

To solve the above drawbacks, an object of the present invention is to provide terminal equipment with a built-in retractable headset, so as to reduce the harm from electromagnetic wave of the terminal equipment to a human body, and to facilitate the user to use.

To achieve the above-mentioned object, the present invention provides terminal equipment with a built-in retractable headset, comprising:

a case body of the terminal equipment which includes an accommodation space;

a headset which is arranged in the accommodation space and includes a headset assembly and a headset line which both can be pulled out of the accommodation space; and a headset line retraction device which is arranged in the accommodation space and with which the headset assembly communicates via the headset line, wherein a signal line led from the headset line retraction device communicates with an audio signal of the terminal equipment, and the headset assembly and the headset line can be retracted from outside the accommodation space via the headset line retraction device.

Preferably, the headset assembly comprises a primary headset assembly, a secondary headset assembly and a headset rod on which the secondary headset assembly is detachably arranged. The headset line comprises double headset lines including a primary headset line communicated with the primary headset assembly and a secondary headset line communicated with the secondary headset assembly, and a single headset line.

Preferably, a winding slot for winding the secondary headset line is arranged on the headset rod.

Preferably, the double headset lines are converted into the single headset line via a joint, and a transmitter is provided at the joint.

Preferably, the single headset line can be wound around a winding reel of the headset line retraction device.

Preferably, a driving force is supplied to the headset line retraction device through a micro motor which is coupled to a battery module of the terminal equipment via a wire.

Preferably, the driving force is supplied to the headset line retraction device through a spring.

Preferably, the terminal equipment is a mobile phone, a panel computer, a laptop computer, a desktop computer, a television, a hand-held computer, a telephone, a personal audio-visual appliance, a digital player, a navigation device or a game machine.

According to the above technical solutions, the present invention has the following advantageous effects. By using the built-in retractable headset structure, it is able to thoroughly solve the problem of headset resource waste for the terminal equipment. When a user uses a terminal equipment (e.g., when answering or making a call), it is unnecessary to lift the terminal equipment up to head, and the user can directly pull the built-in retractable headset assembly and headset line out of the case body of the terminal equipment. When the call is ended, the headset assembly and the headset line can be automatically retracted into the case body of the terminal equipment. As a result, it is able to make the head away from the electromagnetic radiation of the terminal equipment and to free the user's hands, thereby to facilitate the use of the terminal equipment during video calls.

DETAILED DESCRIPTION

In order to make the objects, the solutions and the advantages of the present invention more apparent, the present invention will be described in detail hereinafter in conjunction with the embodiments and the drawings. Here, the embodiments and the descriptions thereof are merely used for illustrative purpose, but shall not be construed as limitations to the present invention.

In the embodiment, the terminal equipment may be a mobile phone, a panel computer, a laptop computer, a desktop computer, a television, a hand-held computer, a telephone, a personal audio-visual appliance, a digital player, a navigation device or a game machine.

Detailed descriptions are provided hereinafter by taking mobile phone as the terminal equipment. The terminal equipment of the other type has the similar structure, and thus will not be repeated herein.

Figure 1:
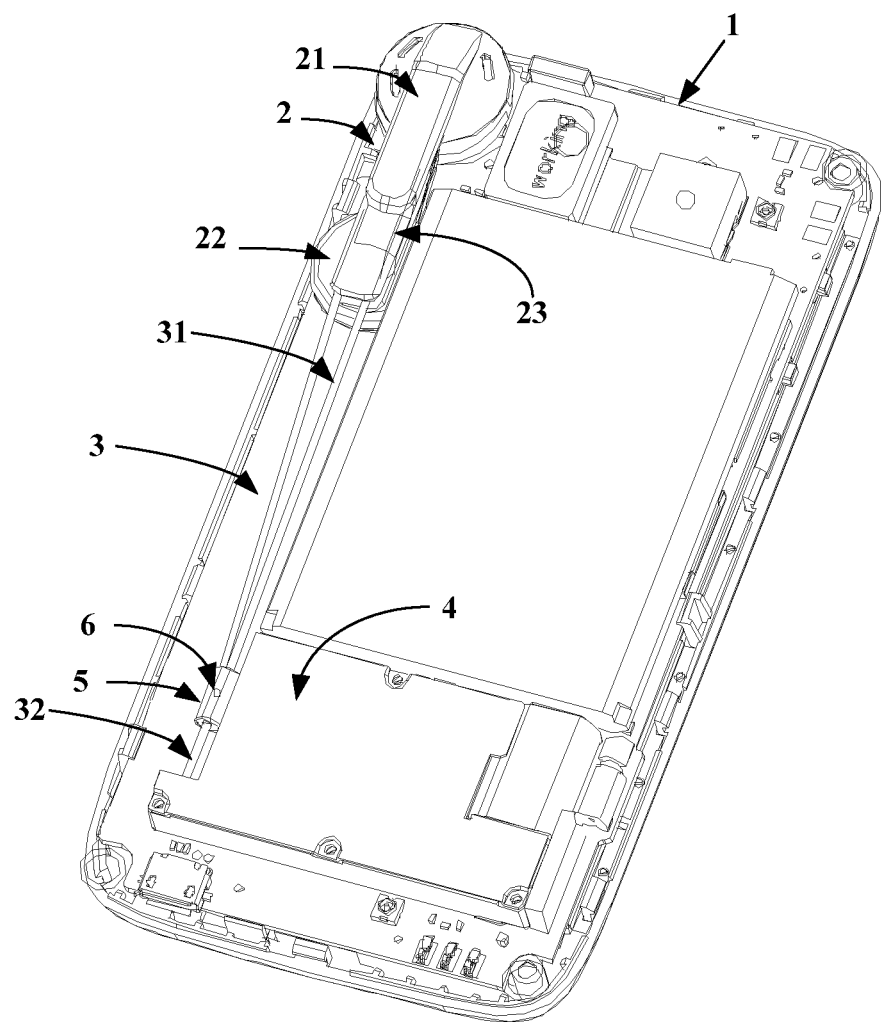
FIG. 1 is a schematic view showing terminal equipment with a built-in retractable headset according to one embodiment of the present invention.

FIG. 1 is a schematic view showing terminal equipment with a built-in retractable headset according to one embodiment of the present invention. As shown in FIG. 1, the terminal equipment with a built-in retractable headset comprises:

a case body 1 of the terminal equipment which includes an accommodation space;

a headset which is arranged in the accommodation space and includes a headset assembly 2 and a headset line 3 which both can be pulled out of the accommodation space; and a headset line retraction device 4 which is arranged in the accommodation space and with which the headset assembly 2 communicates via the headset line 3, wherein a signal line led from the headset line retraction device 4 communicates with an audio signal of the terminal equipment, and the headset assembly 2 and the headset line 3 can be retracted from outside the accommodation space via the headset line retraction device 4.

That is to say, when making or answering a call, a user merely needs to pull the built-in headset assembly 2 and headset line 3 out of the case body 1 of the terminal equipment. After the call is ended, the headset assembly 2 and the headset line 3 can be automatically retracted into the case body 1 of the terminal equipment via the headset line retraction device 4.

In this embodiment, other parts of the terminal equipment, such as a transmitter, a receiver, a camera module and a processing chip, may also be arranged in the accommodation space.

The shape of the case body 1 of the terminal equipment may be adjusted in accordance with the specific situations, and the shape of the case body 1 is not defined in this embodiment.

In this embodiment, the position of the headset in the accommodation space may be adjusted in accordance with the specific situations, e.g., at an upper left part of the accommodation space (as shown in FIG. 1). Of course, the position of the headset in the accommodation space is not defined in this embodiment.

Figure 2:
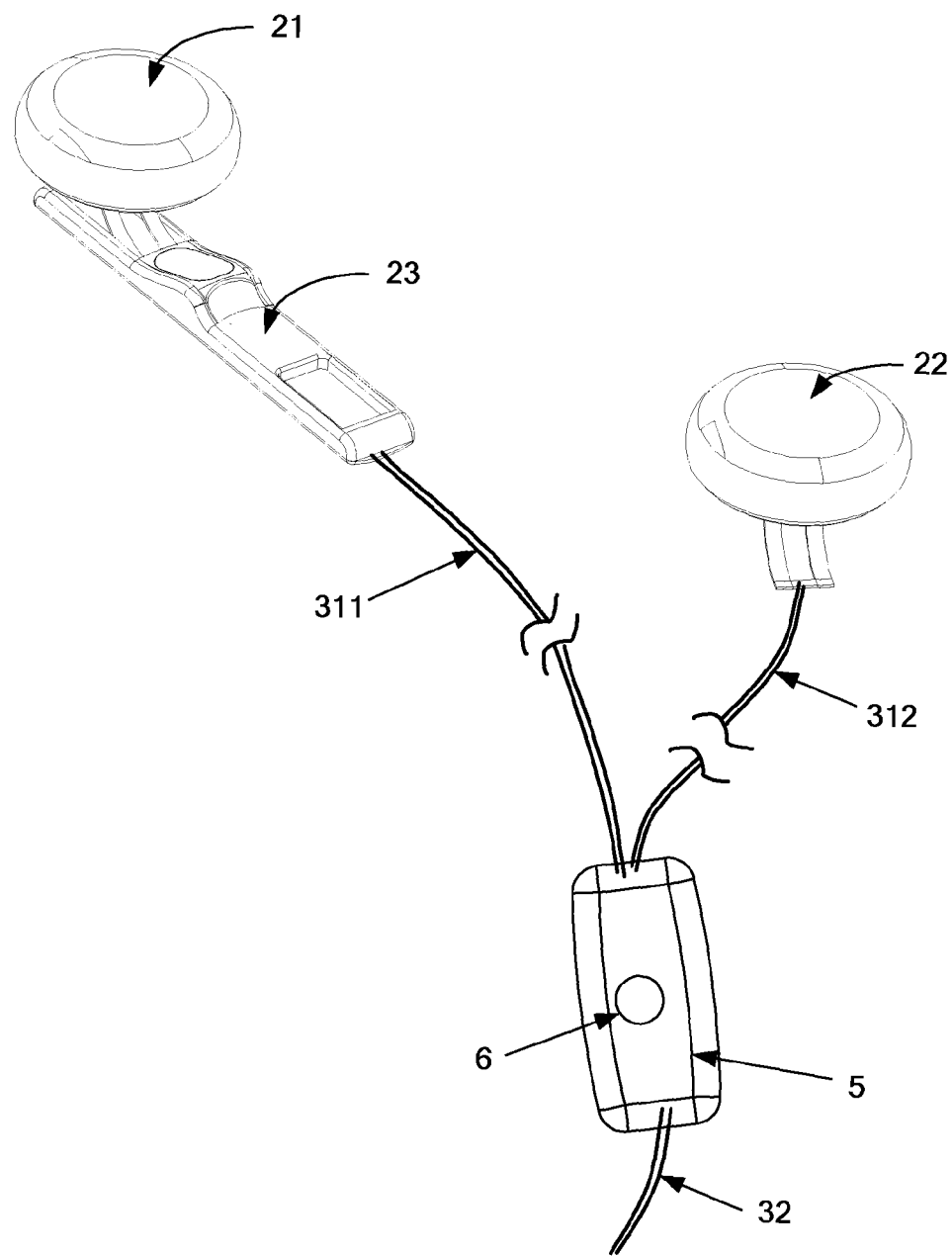
FIG. 2 is a schematic view showing a headset assembly according to one embodiment of the present invention.

FIG. 2 is a schematic view showing the headset assembly according to one embodiment of the present invention. The headset assembly 2 comprises a primary headset assembly 21, a secondary headset assembly 22 and a headset rod 23 on which the secondary headset assembly 22 is detachably arranged. When in use, the secondary headset assembly 22 may be removed from the headset rod 23, and after the use, the secondary headset assembly 22 may be clamped onto the headset rod 23.

For example, the headset rod 23 is provided with a receiving part, and the secondary headset assembly 22 may be detachably connected to the receiving part of the headset rod 23 through a connecting portion on the secondary headset assembly 22.

When a dual-channel output or a stereo output is undesired, merely the primary headset assembly 21 is used, and when the dual-channel output or the stereo output is desired, the primary headset assembly 21 and the secondary headset assembly 22 may be put on the left and right ears, respectively, so as to receive an audio message, thereby to achieve a dual-channel or stereo effect.

In addition, to facilitate the operation, the headset is further provided with a line retraction switch (not shown) for controlling to turn on and off a power supply of a driving device (e.g., a micro motor) in the headset line retraction device 4 through a signal line arranged in the headset line 3. As a result, it is able to flexibly control the retraction of the headset line 3.

As shown in FIGS. 1 and 2, the headset line 3 comprises double headset lines 31 including a primary headset line 311 communicated with the primary headset assembly 21 and a secondary headset line 312 communicated with the secondary headset assembly 22, and a single headset line 32.

In this embodiment, a winding slot (not shown) for winding the secondary headset line 312 is arranged on the headset rod 23.

Referring to FIG. 1 again, the double headset lines 31 are converted into the single headset line 32 via a joint 5, and a transmitter 6 is provided at the joint 5.

In this embodiment, the single headset line 32 can be wound around a winding reel (not shown) of the headset line retraction device 4.

In this embodiment, a driving force is supplied to the headset line retraction device 4 through a micro motor, so as to rotate the winding reel of the headset line retraction device 4 via the micro motor, thereby to retract the single headset line 32.

In this embodiment, the micro motor of the headset line retraction device 4 may be coupled to a battery module of the terminal equipment via a wire and powered by the battery module of the terminal equipment. Of course, the headset line retraction device 4 may also include a self-contained power supply, and the structure of the headset line retraction device 4 is not defined in this embodiment.

Of course, the way of supplying the driving force to the headset line retraction device 4 is not defined in this embodiment, e.g., the driving force may be supplied via the micro motor or a spring.

According to the above technical solutions, the present invention has the following advantageous effects. By using the built-in retractable headset structure, it is able to thoroughly solve the problem of headset resource waste at the terminal equipment. When a user uses the terminal equipment (e.g., when answering or making a call), it is unnecessary to lift the terminal equipment up to head, and the user can directly pull the built-in retractable headset out of the case body of the terminal equipment. As a result, it is able to effectively reduce the harm caused by the electromagnetic radiation from the terminal equipment.

The above are merely the preferred embodiments of the present invention. It should be appreciated that, a person skilled in the art may make further improvements and modifications without departing from the principle of the present invention, and these improvements and modifications shall also be considered as within the range of the present invention.

What is claimed is:

1. A terminal equipment with a built-in retractable headset, comprising:

a case body of the terminal equipment which includes an accommodation space;

a headset which is arranged in the accommodation space and includes a headset assembly and a headset line which both can be pulled out of the accommodation space; and a headset line retraction device which is arranged in the accommodation space and with which the headset assembly communicates via the headset line, wherein a signal line led from the headset line retraction device is communicates with an audio signal of the terminal equipment, and the headset assembly and the headset line can be retracted from the outside of the accommodation space via the headset line retraction device, wherein
the headset assembly comprises a primary headset assembly, a secondary headset assembly and a headset rod on which the secondary headset assembly is detachably arranged.

2. The terminal equipment according to claim 1, wherein
the headset line comprises double headset lines including a primary headset line communicated with the primary headset assembly and a secondary headset line communicated with the secondary headset assembly, and a single headset line.

3. The terminal equipment according to claim 2, wherein
a winding slot for winding the secondary headset line is arranged on the headset rod.

4. The terminal equipment according to claim 2, wherein
the double headset lines are converted into the single headset line via a joint, and a transmitter is provided at the joint.

5. The terminal equipment according to claim 2, wherein
the single headset line can be wound around a winding reel of the headset line retraction device.

6. The terminal equipment according to claim 1, wherein
a driving force is supplied to the headset line retraction device through a micro motor which is coupled to a battery module of the terminal equipment via a wire.

7. The terminal equipment according to claim 1, wherein
a driving force is supplied to the headset line retraction device through a spring.

8. The terminal equipment according to claim 1, wherein
the terminal equipment is a mobile phone, a panel computer, a laptop computer, a desktop computer, a television, a hand-held computer, a telephone, a personal audio-visual appliance, a digital player, a navigation device or a game machine.

* * * * *